(12) United States Patent
Sagar et al.

(10) Patent No.: US 8,983,904 B2
(45) Date of Patent: Mar. 17, 2015

(54) SYNCHRONIZATION OF REPLICATIONS FOR DIFFERENT COMPUTING SYSTEMS

(75) Inventors: Akash Sagar, Redmond, WA (US); Richard Chung, Bothell, WA (US); Jim Murphy, Port Orchard, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/310,605

(22) Filed: Dec. 2, 2011

(65) Prior Publication Data

US 2012/0117025 A1    May 10, 2012

Related U.S. Application Data

(63) Continuation of application No. 12/032,704, filed on Feb. 18, 2008, now Pat. No. 8,086,565.

(51) Int. Cl.
*G06F 17/30* (2006.01)

(52) U.S. Cl.
CPC .................. *G06F 17/30212* (2013.01)
USPC ........................................... 707/610

(58) Field of Classification Search
None
See application file for complete search history.

(56) References Cited

U.S. PATENT DOCUMENTS

| | | | |
|---|---|---|---|
| 5,946,686 A | 8/1999 | Schmuck et al. | |
| 6,351,776 B1 | 2/2002 | O'Brien et al. | |
| 6,377,958 B1 | 4/2002 | Orcutt | |
| 6,687,878 B1 * | 2/2004 | Eintracht et al. | 715/201 |
| 6,985,927 B2 | 1/2006 | O'Brien et al. | |
| 7,171,472 B2 | 1/2007 | O'Brien et al. | |
| 7,213,022 B2 * | 5/2007 | Whelan et | 707/610 |
| 7,337,207 B2 | 2/2008 | O'Brien et al. | |

(Continued)

FOREIGN PATENT DOCUMENTS

| | | |
|---|---|---|
| AU | 1468301 | 5/2001 |
| EP | 1103895 | 6/2001 |

(Continued)

OTHER PUBLICATIONS

"File System Watcher", retrieved from http://software.techrepublic.com.com/download.aspx?docid=194518, 3 pages.

(Continued)

*Primary Examiner* — Jay Morrison
(74) *Attorney, Agent, or Firm* — John Jardine; Kate Drakos; Micky Minhas

(57) ABSTRACT

A file system watcher in the presence of different file systems to allow synchronization of replicated files distributed among different file systems without compromising the features of each file system is described. To synchronize the distributed replications, a platform independent synchronization manager creates a file system watcher for each file system associated with a replication of the file. The file system watcher monitors each object for events affecting the object or the object's constituent files, such as creation, deletion, change and rename. Notifications are sent to the synchronization manager, which consolidates the modifications and updates a locally stored replication, if necessary. The synchronization manager then sends a notification of an update to other synchronization managers for replications of the distributed file or folder. Synchronization is complete when the nonconforming synchronization managers acquire a replication of the locally stored replication and update their respective objects.

21 Claims, 5 Drawing Sheets

(56) References Cited

U.S. PATENT DOCUMENTS

| | | |
|---|---|---|
| 7,496,578 B2 | 2/2009 | O'Brien et al. |
| 7,529,780 B1 * | 5/2009 | Braginsky et al. ............... 1/1 |
| 7,651,593 B2 * | 1/2010 | Prahlad et al. ............ 202/204 |
| 8,086,565 B2 | 12/2011 | Sagar |
| 2002/0169830 A1 | 11/2002 | Mild et al. |
| 2002/0178162 A1 | 11/2002 | Ulrich et al. |
| 2003/0217077 A1 | 11/2003 | Schwartz et al. |
| 2004/0083245 A1 * | 4/2004 | Beeler, Jr. ................ 707/204 |
| 2004/0088332 A1 * | 5/2004 | Lee et al. ................. 707/200 |
| 2004/0133570 A1 | 7/2004 | Soltis |
| 2004/0172423 A1 | 9/2004 | Kaasten et al. |
| 2004/0250172 A1 | 12/2004 | Patel et al. |
| 2005/0246311 A1 * | 11/2005 | Whelan et al. ................ 707/1 |
| 2005/0251540 A1 | 11/2005 | Sim-Tang |
| 2005/0289243 A1 * | 12/2005 | McInerney ................ 709/248 |
| 2006/0112150 A1 * | 5/2006 | Brown et al. ............. 707/201 |
| 2006/0206533 A1 | 9/2006 | MacLaurin et al. |
| 2006/0224775 A1 * | 10/2006 | Lee et al. ................. 709/248 |
| 2007/0038857 A1 | 2/2007 | Gosnell |
| 2007/0067349 A1 * | 3/2007 | Jhaveri et al. ............ 707/200 |
| 2007/0073840 A1 | 3/2007 | O'Brien et al. |
| 2007/0185919 A1 * | 8/2007 | Kaplan et al. ............. 707/201 |
| 2007/0260619 A1 * | 11/2007 | Whelan et al. ............ 707/100 |
| 2007/0288551 A1 * | 12/2007 | Sidon ....................... 709/203 |
| 2008/0133617 A1 * | 6/2008 | Bali et al. ................ 707/202 |
| 2009/0083566 A1 * | 3/2009 | Momenee et al. .......... 713/400 |
| 2009/0210454 A1 | 8/2009 | Sagar |
| 2010/0185614 A1 | 7/2010 | O'Brien et al. |

FOREIGN PATENT DOCUMENTS

| | | |
|---|---|---|
| JP | 2003514279 | 4/2003 |
| WO | WO-0133381 | 5/2001 |
| WO | WO-2004042618 | 5/2004 |

OTHER PUBLICATIONS

"Final Office Action", U.S. Appl. No. 12/032,704, (Nov. 10, 2010), 15 pages.

"Non Final Office Action", U.S. Appl. No. 12/032,704, (May 20, 2010), 11 pages.

"Non-Final Office Action", U.S. Appl. No. 12/032,704, (Mar. 24, 2011), 17 pages.

"Notice of Allowance", U.S. Appl. No. 12/032,704, (Aug. 24, 2011), 4 pages.

Corbett, Peter F., et al., "The Vesta Parallel File System", *ACM Transactions on Computer Systems*, vol. 14, No. 3, (Aug. 1996), pp. 225-264.

Liskov, Barbara et al., "Replication in the Harp File System", *Laboratory for Computer Science, Massachusetts Institute of Technology*, (2003), 13 pages.

Sobolewski, Michael et al., "Service-Oriented File Sharing", *Proceedings of the 2nd IASTED International Conference, Communications, Internet, and Information Technology*, Scottsdale, AZ, (Nov. 17-19, 2003), pp. 1-7.

* cited by examiner

US 8,983,904 B2

SYNCHRONIZATION OF REPLICATIONS FOR DIFFERENT COMPUTING SYSTEMS

RELATED APPLICATIONS

This application is a continuation of and claims priority under 35 U.S.C. §120 to U.S. patent application Ser. No. 12/032,704, filed on Feb. 18, 2008 and titled "File System Watcher in the Presence of Different File Systems," the disclosure of which is incorporated by reference in its entirety herein.

BACKGROUND

Computerized systems have made a significant contribution towards the advancement of modern society and are utilized in a number of applications to achieve advantageous results. The computerization of filing systems (i.e., systems for the storage and organization of documents or objects as electronic data) is one such example of an application that has benefited from the utilization of computerized systems.

Computerized filing systems are now available that enable an electronic object to be shared and updated among multiple remote systems. Popular applications of synchronized computerized filing systems include applications which monitor shared files for updates to any of the files being shared. Typically, when an object—such as a file—has been updated at any terminal with access, the update and/or the updated file is then perpetuated across the remaining distributed replicas of the file by a synchronizing controller application.

There are multiple file systems in existence on various platforms (e.g., FAT, NTFS, HFS, etc.) and operating systems. File synchronization software needs to watch for changes to files and folders (and other artifacts) on these file systems that are being synchronized. However, not only do different operating systems have different methods of interacting with the underlying file system, the different file systems also have different capabilities, metadata and application programming interface ("API") support for detecting changes. Existing synchronization software typically designate only one file system to support and do not extend synchronization functionality to other file systems. Synchronization software that support multiple platforms tend to use the least common denominator approach—providing only compatible, often basic capabilities—and therefore cannot make use of advanced capabilities on some file systems.

Additional problems may arise when applications relate distinct files together while operating on them. For example, a database application may store data in both a data file and an index file-one of these files is not enough to recreate or interpret all the data. During synchronization, the versions of both files must match for the application to work. This inevitably adds to the complexity of the synchronization operation.

The file manipulation processes for some application may include creating temporary hidden files and performing rename and delete operations during subsequent updates to obtain the final operations. In such a process, the watcher must use rules to ignore the intermediate renames and deletes, etc. Currently implemented watchers have either a few of these rules statically coded or none at all, and as a result suffer from a lack of efficiency and/or flexibility to deal with new idiosyncrasies in file manipulation techniques.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One embodiment of the claimed subject matter is implemented to synchronize files or folders with replications distributed among computer systems with different file systems without compromising the features of each file system. This embodiment includes monitoring a file or folder for modifications. A file watcher is implemented to monitor modifications of the file or folder. The modification is processed to determine if the modification was a material modification. In the event of a material modification, the locally stored replication of the file or folder is updated to reflect the modification. Once the locally stored replication of the file or folder is updated, the modification is perpetuated among all replications, regardless of the file system, while preserving individual features of the file system.

In another embodiment, the claimed subject matter is implemented as a system which synchronizes files or folders with replications distributed among computer systems with different file systems. This embodiment includes a synchronization manager that creates a file system watcher to monitor each replication of the file or folder and a local storage (such as a locally implemented database) for storing metadata about each replication of the file or folder. The synchronization manager coordinates the file watchers for each replication using a common metadata and storage infrastructure and utilizes a synchronization engine to perform the synchronization across the other replications when a replication is updated.

Another embodiment is implemented as a computer environment for synchronizing files or folders with distributed replications among computer systems with different file systems, wherein a synchronization manager and a synchronization engine is implemented within the computer environment to achieve the functionality of the claimed subject matter.

DETAILED DESCRIPTION

Figure 1:
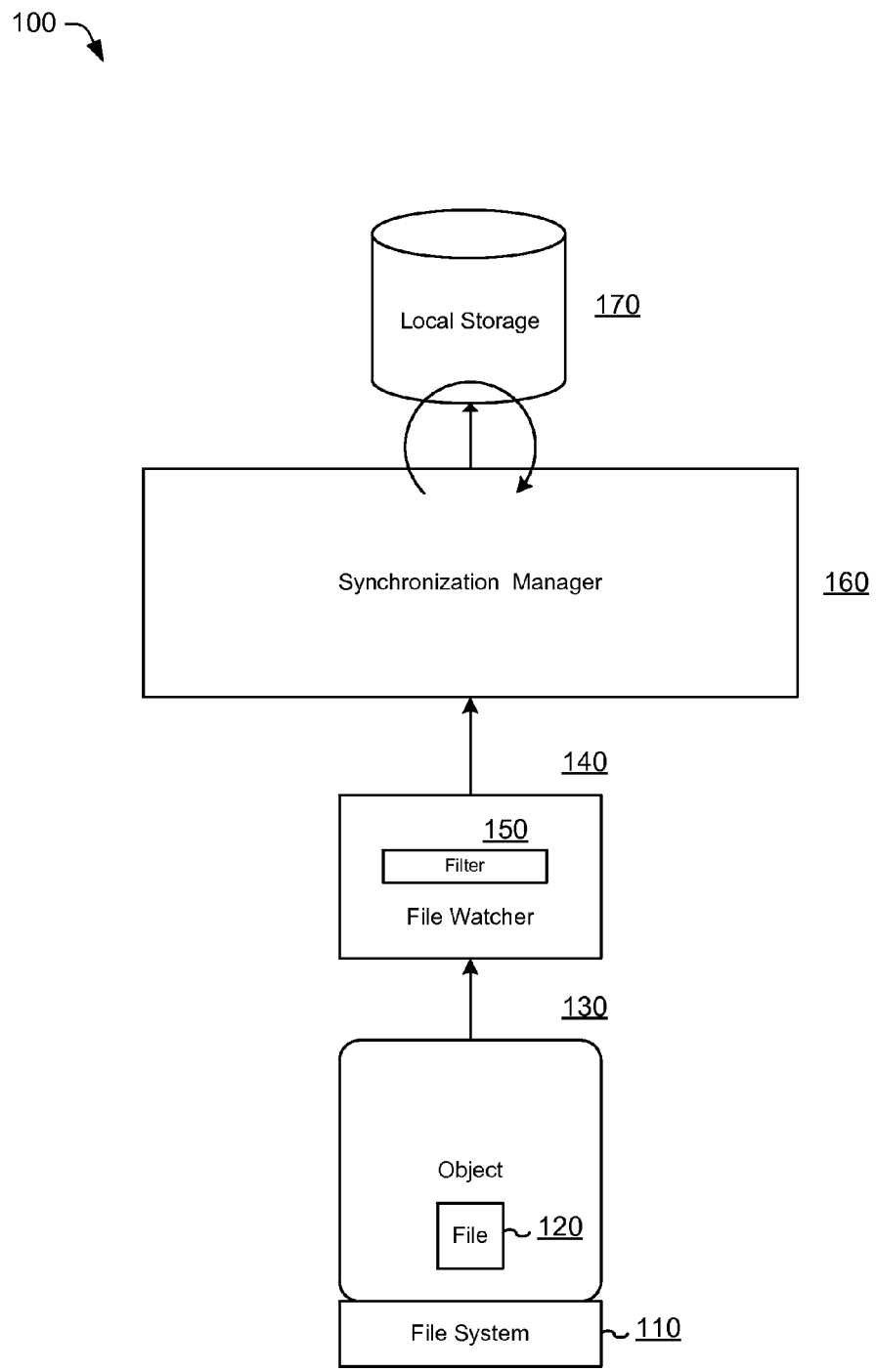
FIG. 1 is a diagram of a system for monitoring a modification to a replication of a distributed file of a file system type and updating a replication of the same distributed file in local storage in accordance with various embodiments.

Reference will now be made in detail to the preferred embodiments of the claimed subject matter, a method and apparatus for synchronizing electronic files or objects replicated among a plurality of file systems, examples of which are illustrated in the accompanying drawings. While the claimed subject matter will be described in conjunction with the preferred embodiments, it will be understood that they are not intended to be limited to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, embodiments of the claimed subject matter provide for a method and an apparatus for synchronizing replications of electronic files or objects distributed among different file systems without compromising the features inherent to the respective file systems. According to the claimed subject matter, the replications distributed among the different file systems are monitored for updates. A file system-independent manager is notified of any updates to the replications and synchronizes the replications by perpetuating the update among the distributed replications. The features of each file system are preserved by the file system-independent manager, which is implemented to allow for the ability of storage of file system specific metadata for a file. Embodiments of the claimed subject matter and their benefits are further described below.

FIG. 1 is a diagram of a system 100 for monitoring a modification to a replication of a distributed file of a file system type and updating a replication of the same distributed file in local storage in accordance with various embodiments.

According to the system 100 of FIG. 1, a replication of a file 120 is contained in an object 130 of a specific file system 110. The type of file system may be specific to the operating system employed by a computer system. An example of a replicated folder includes a folder on a hard drive of a computer system.

System 100 includes a Synchronization Manager 160 that is platform (file system) independent. The Synchronization Manager 160 for the replicated folder 130 creates a File System Watcher 140 in the computer system for the replicated folder 130. The File System Watcher 140 monitors the replicated folder 130 for any modifications to the replicated folder 130 on that file system and its constituent files 120. Upon creation, the File System Watcher 140 is associated with the replicated folder 130, including the features inherent to the file system 110 available to the replicated folder 130. These features may include, for example, a file system-unique identification number, the full path of the replicated folder 130 in the system and other information that may be needed for filtration purposes, such as file extensions or attributes.

Any event (e.g., modification) that occurs to the replicated folder 130 or its constituent files 120 creates a raw notification from the file system that is detected by the File System Watcher 140. The File System Watcher 140 processes the raw notifications. Raw notifications may include notifications that the file 120 contained in the object 130 has been created, deleted, renamed, or otherwise changed. Other events may also include the creation of temporary files created by the computer system or required by the file system 110 for internal operations. For instance, some applications will save new versions of files by renaming the old version to another temporary name before renaming the updated file to the original file name, and then deleting the now outdated file. The creation of the new (temporary) file would be detected as a raw event, and a notification would be sent to the File System Watcher 140.

According to some embodiments, the File System Watcher 140 includes filters 150 specific to the replicated folder 130. The filters 150 may be used, for example, to remove events for internal system use only, such as those specified above. In other embodiments, the filter may be custom-defined by the user to remove certain file extensions. The filtered notification is sent by the File System Watcher 140 and received by the Synchronization Manager 160.

The system 100 includes a local storage 170, which stores a replication of the file 120. The Synchronization Manager 160 consolidates the notifications processed by the File System Watcher 140 and determines if a modification to the replication of the file stored in the local storage 170 is necessary. In the event the Synchronization Manager 160 determines that modification to the stored replication is necessary, the Synchronization Manager 160 updates the metadata of the replication in local storage 170 accordingly.

Furthermore, given that the Synchronization Manager 160 and underlying local storage is file system and platform independent, new File System Watchers 140 can be created and adapted by the Synchronization Manager 160 for use with new file systems and/or operating systems with relative ease.

Figure 2:
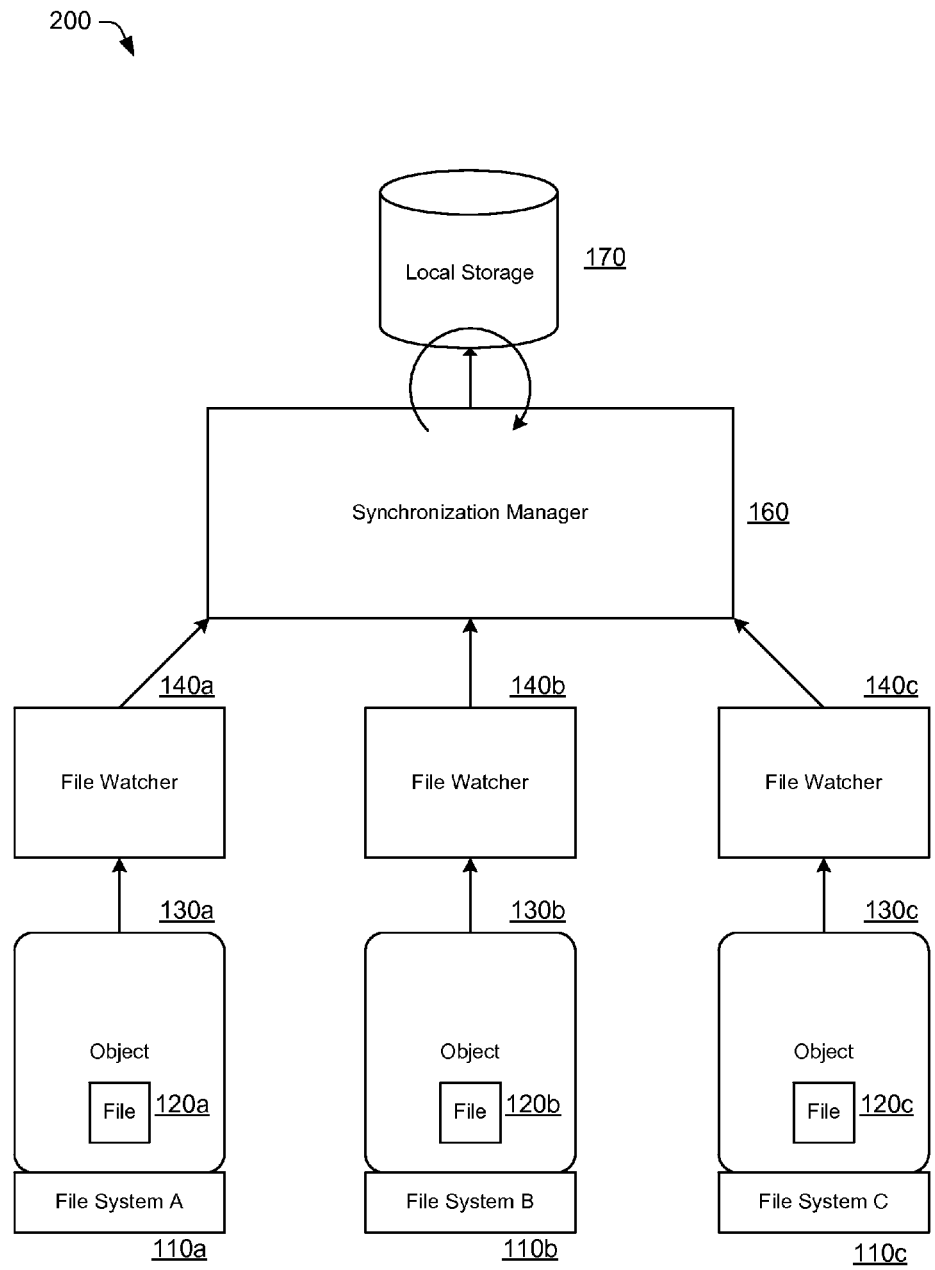
FIG. 2 is a diagram of a system for synchronizing replications of a file distributed among a plurality of file systems in accordance with various embodiments.

FIG. 2 is a diagram of a system 200 for synchronizing replications of a file distributed among a plurality of file systems in accordance with various embodiments.

According to the system 200 of FIG. 2, a file 120 has replications 120*a*, 120*b*, 120*c* distributed in separate replicated folders 130*a*, 130*b*, 130*c* of three distinct file systems 110*a*, 110*b*, 110*c*. As previously discussed, the type of file system may be specific to the operating system employed by a computer system. Some examples of well known file systems include FAT (File Allocation Table), NTFS (New Technology File System), and HFS (Hierarchical File System). Each file system provides a certain set of features for its files.

For example, the FAT file system is a relatively basic file system that accounts for the lengths and last modified dates of its files. The more advanced NTFS includes the features of FAT and adds additional features such as a system-unique serial number for each of its files, as well as keeping a log of changes to the file. HFS is generally acknowledged as somewhere in between FAT and NTFS in complexity, providing capabilities not available in FAT, but lacking some of the NTFS features.

System 200 includes a Synchronization Manager 160 that is platform (and thus, file system) independent. The Synchronization Manager 160 creates a File System Watcher 140 for each replicated folder 130. Thus, File System Watcher 140a is created specifically for replicated folder 130a, a replicated folder 130 of file system 110a; File System Watcher 140b is created specifically for replicated folder 130b, a replicated folder 130 of file system 110b; and File System Watcher 140c is created specifically for replicated folder 130c, a replicated folder 130 of the file system 110c. Upon creation, the File System Watcher 140a, 140b, 140c is associated with its specific replicated folder 130a, 130b, 130c, and includes the features inherent to the file system 110a, 110b, 110c available to the replicated folder 130a, 130b, 130c. Each File System Watcher 140a, 140b, 140c monitors its associated replicated folder 130a, 130b, 130c for any modifications to the associating replicated folder 130a, 130b, 130c and the replicated files 120a, 120b 120c contained in the replicated folder 130a, 130b, 130c. As previously discussed, examples of these features may include a system-unique identification number, file length, the full path of the replicated folder 130 in the system and other information needed for filtration purposes, such as file extensions or attributes.

Any modification to or within a replicated folder 130a, 130b, 130c creates a raw notification or event from the file system which is detected by the File System Watcher 140a 140b, 140c associated with the replicated folder 130a, 130b, 130c. The File System Watcher 140a 140b, 140c processes the raw notifications and events. Raw events would include notifications that a file 120a, 120b, 120c contained in the object 140a 140b, 140c has been created, deleted, renamed, or otherwise modified.

The system 200 includes a local storage 170, which stores a replication of the file 120. The Synchronization Manager 160 consolidates the notifications processed by the File System Watchers 140a, 140b, 140c and determines if a modification to the replication of the file stored in the local storage 170 is necessary (i.e., due to a modification of a file 120a, 120b, 120c). In the event the Synchronization Manager 160 determines that modification to the stored replication is necessary, the Synchronization Manager 160 updates the metadata of the replication in local storage 170 accordingly. The architecture of the local storage 170 is implemented to allow storage of file system specific metadata for the replications of the file 120, 120b, 120c, such as the unique serial number for an NTFS file system.

After the replication stored in local storage 170 is updated by the Synchronization Manager 160, the replication is acquired by the file systems with the un-updated and nonconforming replications—thus achieving synchronization. In some embodiments, the replication in the local storage 170 is downloaded to the computer systems employing the file systems with the nonconforming replications. A synchronization engine 501d in the Synchronization Manager 501c perpetuates the synchronization by determining the necessary updates and accompanying metadata associated with each file system 110a, 110b, 110c. Each File System Watcher 140a, 140b, 140c uses a common metadata containing the features of, and compatible with, each file system 110a, 110b, 110c to identify each file, therefore preserving the file system specific features regardless of the file system 110a, 110b, 110c.

The file system specific features are preserved by implanting the metadata of less complex file systems with artificial metadata compatible with the file systems that provide greater capabilities. For example, a file under an NTFS file system would include in its metadata a system-unique serial ID number. In the system 200, the Synchronization Manager 160 keeps track of the IDs of NTFS files. However, FAT file systems do not support this feature. In this case, the File System Watcher 140 specific to a FAT file system would generate an ID number (which may not be unique in the system) that the Synchronization Manager 160 can use. The Synchronization Manager 160 handles the fact that the ID may or may not be unique, and uses it to track the file through the lifetime of the file, as it would under an NTFS file system.

Figure 3:
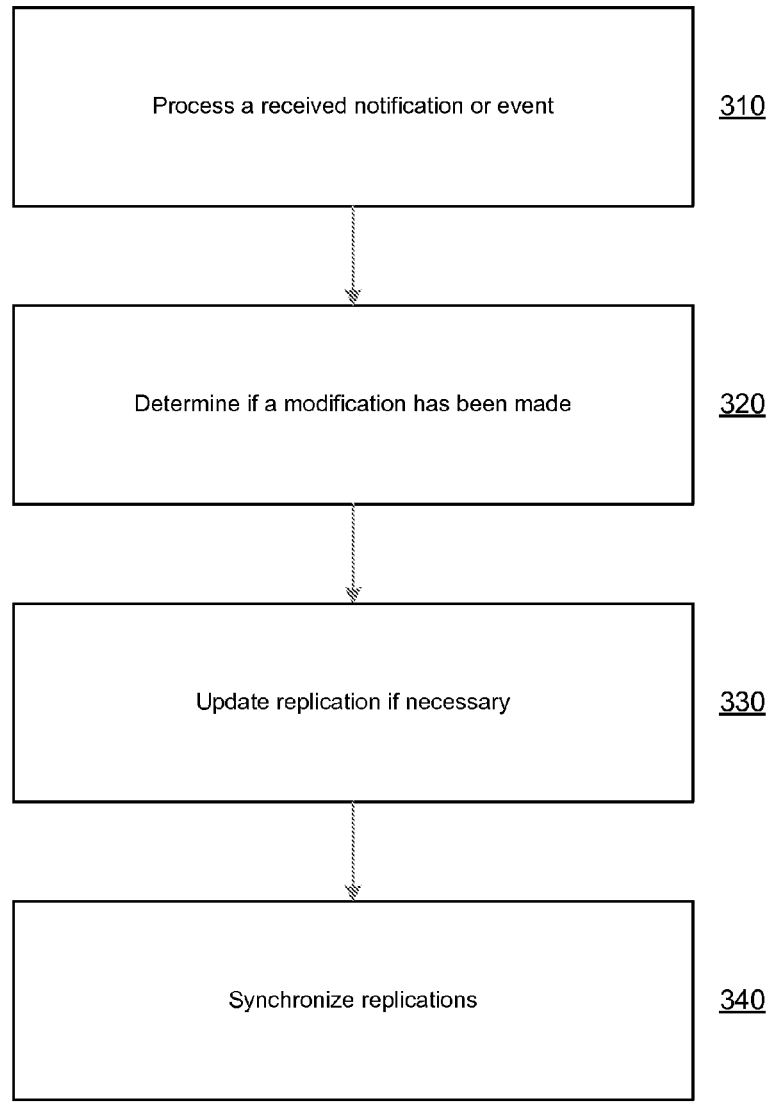
FIG. 3 is a flowchart describing a process for synchronizing replications of a file distributed among a plurality of file systems in accordance with varying embodiments.

FIG. 3 is a flowchart describing a process 300 for synchronizing replications of a file distributed among a plurality of file systems in accordance with varying embodiments. Steps 310-340 describe exemplary steps comprising the process 200 in accordance with the various embodiments herein described.

According to the process 300 of FIG. 3, a raw notification or event from the file system 110 is processed in the respective file-system implementation of the File System Watcher 140 at step 310. According to some embodiments, File System Watcher 140 includes a filter 150. Events are filtered according to the filter 150 for the specific object 130. For example, an object 130 may be a folder of documents, and thus only events that affect document files would be monitored. Notifications regarding non document files would therefore be "filtered" by the File System Watcher 140 and prevented from reaching the Synchronization Manager 160, and thus, other replications.

At step 320, the File System Watcher 140 determines if a material modification has been made. A material modification would include modifications such as creation, deletion, change and rename that would require synchronization among the distributed replications. A modification may be determined by the File System Watcher 140 depending on the specific file system the replication is located on. For example, in a FAT file system, determining updates may be performed through comparing file lengths, or the last modified dates of the files. An NTFS system on the other hand, may compare unique serial numbers attributed to the files and each modification to determine whether a new modification to the file has been made.

At step 330, the notification is sent to the Synchronization Manager 160. The architecture of the Synchronization Manager 160 allows for the storage of file system specific metadata for the file. Depending upon the determination of a material modification at step 320, the Synchronization Manager 160 will update the replication existing on the local storage 170 if necessary.

At step 340, the Synchronization Manager 160 sends a notification to the distributed replications that the file 120 and/or object 130 has been modified. The replication stored in the local storage 170 is subsequently downloaded by each system with a replication of the file 120 or object 130 and all replications are synchronized to conform to the replication stored in the local storage 170.

Figure 4:
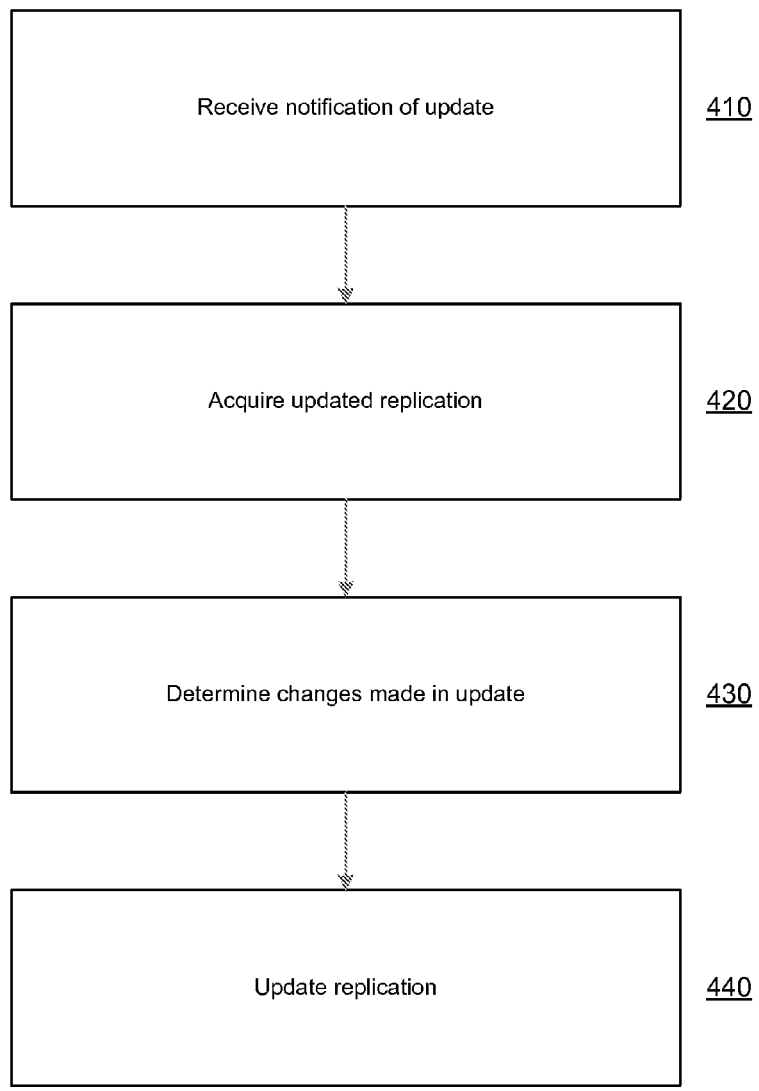
FIG. 4 is a flowchart describing a process for updating replications of a file distributed among a plurality of file systems in accordance with varying embodiments.

FIG. 4 is a flowchart describing a process 300 for updating replications of a file distributed among a plurality of file systems in accordance with varying embodiments. As depicted in FIG. 4, Steps 410-440 describe the constituent steps of synchronizing replications as provided in the step 340 of FIG. 3.

At step 410, the File Watcher 140 monitoring a replicated folder 130 of a file system 110 receives a notice from the Synchronization Manager 160 that an update has been made that requires conformation. The update may include a modification to a file 120 contained in the replicated folder 130. Modifications typically include a name change, the creation of a new file 120 in the replicated folder 130, changes in the file 120 contained in the replicated folder 130 or the deletion of an existing file 120 in the replicated folder 130.

At step 420, the File Watcher 140 acquires an updated replication of the file 120 or object 130 that requires synchronization. The File Watcher 140 may acquire the updated replication by downloading the updated replication from the Synchronization Manager 160 or directly from the local storage 170.

At step 430, the File System Watcher 140 determines the changes made in the updated replication. Due to the cross-platform nature of the synchronization, the File System Watcher 140 may be required to adjust the metadata of the updated replication to be compatible with the file system 110 of the associated replicated folder 130.

At step 440, the File System Watcher 140 updates the replication of the file 120 or replicated folder 130 of the file system 110 to conform to the replication in the local storage. File System Watcher 140 also updates the metadata, as necessary, depending on the available features of the associating file system 110.

Figure 5:
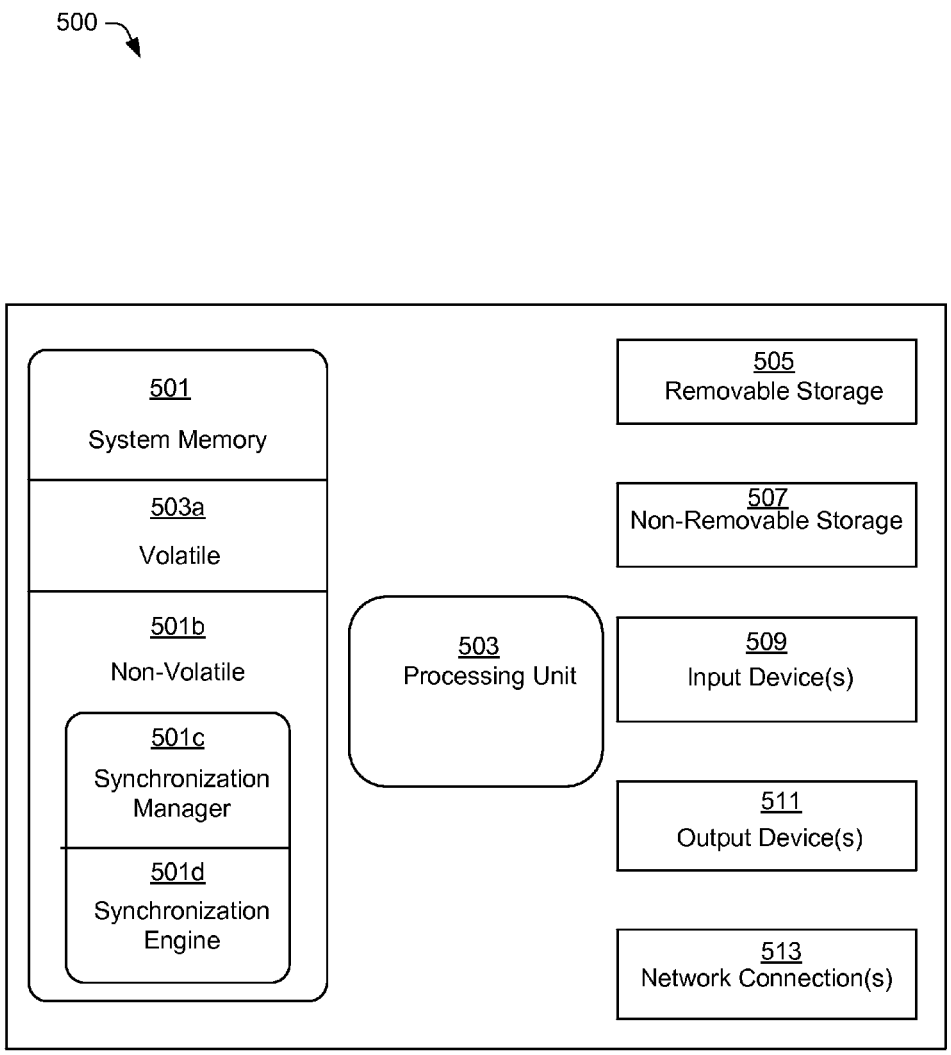
FIG. 5 shows an exemplary computing device according to various embodiments.

FIG. 5 shows an exemplary computing device 500 according to various embodiments. Computing device 500 depicts the components of a basic computer system providing the execution platform for certain software-based functionality in accordance with various embodiments. Computing device 500 can be an environment upon which the Synchronization Manager 160 from various embodiments is instantiated. Computing device 500 can also be an environment upon which a File System Watcher 140 is created by the Synchronization Manager 160 to monitor a replicated folder 130 of a file system 110. In addition, computer device 500 can be an environment upon which the local storage 170 is implemented, as a database, for example. Computing device 500 can be implemented as, for example, a desktop computer system, laptop computer system or server computer system. Similarly, computing device 500 can be implemented as a handheld device (e.g., cell-phone, etc.) Computing device 500 typically includes at least some form of computer readable media. Computer readable media can be a number of different types of available media that can be accessed by computing device 400 and can include, but is not limited to, computer storage media.

In its most basic configuration, computing device 500 typically includes processing unit 503 and memory 501. Depending on the exact configuration and type of computing device 500 that is used, memory 501 can be volatile (such as RAM) 501a, non-volatile 501b (such as ROM, flash memory, etc.) or some combination of the two. In one embodiment, the Synchronization Manager 501c is instantiated in the non-volatile memory 501b. The Synchronization Manager 501c may include a synchronization engine 501d, which performs the synchronization of the replications distributed among the plurality of file systems. According to some embodiments, local storage 170 may be instantiated in the non-volatile memory 501b or as cache in volatile memory 501a.

Additionally, computing device 500 can include mass storage systems (removable 505 and/or non-removable 507) such as magnetic or optical disks or tape. Similarly, computing device 500 can include input devices 509 and/or output devices 511 (e.g., such as a display). Additionally, computing device 500 can include network connections 513 to other devices, computers, networks, servers, etc. using either wired or wireless media. As all of these devices are well known in the art, they need not be discussed in detail.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving by a synchronization manager a notification of a modification to content in a replication folder of a computing system among multiple computing systems, the notification indicative of particular data types or file types of content to replicate in accordance with a filter setting for the replication folder, the notification being filtered in accordance with the filter setting prior to the notification being received by the synchronization manager, the synchronization manager configured to collectively manage different file systems of the multiple computing systems;
   updating a replication of the replication folder maintained in storage associated with the synchronization manager to reflect the modification including updating content in the replication that corresponds to the particular data types or file types specified by the received notification in accordance with the filter setting; and
   synchronizing by the synchronization manager at least one of multiple distributed replications associated with the multiple computing systems based on the updated replication, the synchronizing of the at least one of the multiple distributed replications being configured to preserve individual file system-specific features of each respective file system including system-unique metadata.

2. The method according to claim 1, wherein the modification is an update to one or more files in the replication folder.

3. The method according to claim 1, wherein the modification is an addition of a new file to the replication folder.

4. The method according to claim 3, wherein synchronizing the at least one of the multiple distributed replications comprises distributing the new file to the multiple computing systems.

5. The method according to claim 1, wherein the modification is a deletion of a file in the replication folder.

6. The method according to claim 1, wherein synchronizing the at least one of the multiple distributed replications comprises sending a notification of the modification to each of the multiple computing systems to cause each of the multiple computing systems to perform synchronization to conform to the updated replication of the replication folder maintained in the storage associated with the synchronization manager.

7. The method according to claim 1, wherein synchronizing the at least one of the multiple distributed replications comprises providing the modification for download by each of the multiple computing systems.

8. The method according to claim 1, wherein the replication of the replication folder maintained in storage associated with the synchronization manager is configured to store file system specific metadata for the at least one of the multiple distributed replications associated with the multiple computing systems.

9. The method according to claim 1, wherein at least some of the multiple computing systems across which the at least one of the multiple replications are synchronized have different operating systems.

10. The method according to claim 1, further comprising distributing a file system watcher component to each of the multiple computing systems that is file system dependent and configured to monitor a corresponding one of the multiple distributed replications and provide notifications to the synchronization manager when modifications occur to the corresponding one of the multiple distributed replications.

11. The method according to claim 1, further comprising adjusting metadata associated with the replication of the replication folder in storage based on the modification, the metadata configured according to a common metadata infrastructure to enable compatibility across different file systems employed by the multiple computing systems.

12. One or more computer readable storage media storing instructions that when executed by a computing device implement a synchronization manager configured to perform operations comprising:
  collectively managing different file systems of multiple computing systems by at least:
    updating a first replication of a folder maintained in storage associated with the synchronization manager to reflect a modification made to a second replication of the folder maintained by a particular computing system among multiple computing systems responsive to detecting the modification, the modification detected based on a notification that is filtered in accordance with a filter setting for the second replication of the folder prior to the modification being detected by the synchronization manager, the notification including an indication of particular data types or file types of content to replicate in accordance with the filter setting for the second replication of the folder; and
    synchronizing at least one of multiple distributed replications associated with the multiple computing systems based on the updated first replication of the folder, the synchronizing of the at least one of the multiple distributed replications being configured to preserve individual file system-specific features of each respective computing system including system-unique metadata.

13. One or more computer readable storage media according to claim 12, wherein the modification is an addition of a new content to the second replication of the folder.

14. One or more computer readable storage media according to claim 13, wherein the synchronization manager is further configured to perform operations comprising:
  notifying the multiple computing systems of the modification to cause the multiple computing systems to download the new content to conform the at least one of the multiple distributed replications of the folder to the updated first replication maintained in the storage associated with the synchronization manager.

15. One or more computer readable storage media according to claim 12, wherein the computing device is connected over a network to the multiple computing systems having the at least one of the multiple distributed replications of the folder.

16. One or more computer readable storage media according to claim 12, wherein the first replication of the folder maintained in the storage associated with the synchronization manager is configured as a file cache accessible by the multiple computing systems over a network connection to obtain modifications to conform the at least one of the multiple distributed replications to the updated first replication of the folder maintained in the storage associated with the synchronization manager.

17. A computing device comprising:
  a memory device storing a local version of a replication folder that is maintained in network-accessible storage by a synchronization manager, the synchronization manager configured to collectively manage different file systems of multiple computing systems; and
  a file system watcher component being associated with the local version of the replication folder and including one or more system-specific features inherent to a file system available to the local version of the replication folder, the file system watcher component operable to synchronize the local version with the replication folder maintained by the synchronization manager including:
    monitoring to detect a modification of the replication folder, the modification being detected based on a notification of the modification that includes an indication of particular data types or extension types that are updateable in accordance with a filter setting for the replication folder, the filter setting usable to filter the particular data types or extension types prior to the modification being detected; and
    interacting over a network with the synchronization manager to obtain the detected modification and update the local version to conform to the replication folder, the update configured to preserve the system-specific features of the file system.

18. The computing device according to claim 17, wherein interacting comprises downloading one or more files changed by the modification over the network from the replication folder maintained in the network-accessible storage.

19. The computing device according to claim 17, wherein the computing device is a networked hand-held computing device.

20. The computing device according to claim 17, wherein:
  the modification comprises creation of a new file by one of the multiple computing systems; and
  interacting comprises downloading the new file from the replication folder maintained in the network-accessible storage, the replication folder updated by the synchronization manager to include the new file.

21. A method comprising:
  defining a filter setting to specify one or more data types or file types of content to be synchronized with at least one of multiple distributed replications of the content, the filter setting being defined by a file system watcher component that is associated with the content and which includes system-unique features inherent to a file system available to the content;
  detecting events corresponding to modifications to the content;
  filtering the events according to the one or more data types or file types of content specified by the filter setting to detect filtered modifications to the content;
  sending a notification of the filtered modifications to a synchronization manager that is configured to synchronize the at least one of the multiple distributed replications of the content across different file systems of multiple computing systems while preserving the system-unique features inherent to the file system and allowing additional system-unique features of each respective file system to be preserved.

\* \* \* \* \*